United States Patent
Maier et al.

(10) Patent No.: US 9,309,822 B2
(45) Date of Patent: Apr. 12, 2016

(54) METHOD FOR OPERATING AN INTERNAL COMBUSTION ENGINE, CONTROL ELEMENT, INTERNAL COMBUSTION ENGINE

(75) Inventors: Tobias Maier, Ingolstadt (DE); Achim Lange, Ingolstadt (DE)

(73) Assignee: AUDI AG, Ingolstadt (DE)

(*) Notice: Subject to any disclaimer, the term of this patent is extended or adjusted under 35 U.S.C. 154(b) by 220 days.

(21) Appl. No.: 13/305,253

(22) Filed: Nov. 28, 2011

(65) Prior Publication Data
US 2012/0298080 A1 Nov. 29, 2012

(30) Foreign Application Priority Data
Nov. 29, 2010 (DE) .................. 10 2010 052 644

(51) Int. Cl.
| | |
|---|---|
| F02B 25/06 | (2006.01) |
| F02D 41/00 | (2006.01) |
| F01M 13/00 | (2006.01) |
| F02D 41/18 | (2006.01) |
| F02M 25/06 | (2006.01) |
| F01M 13/02 | (2006.01) |

(52) U.S. Cl.
CPC .......... *F02D 41/0002* (2013.01); *F01M 13/00* (2013.01); *F02D 41/187* (2013.01); *F02M 25/06* (2013.01); *F01M 13/023* (2013.01); *F02D 2200/0402* (2013.01); *F02D 2250/08* (2013.01); *Y02T 10/42* (2013.01)

(58) Field of Classification Search
USPC ......... 123/572, 41.86, 339.12, 339.14, 339.2, 123/339.21, 339.23, 406.45, 406.49, 123/406.68, 674, 684, 444, 463, 465, 486, 123/513, 568.22, 587; 701/103
See application file for complete search history.

(56) References Cited

U.S. PATENT DOCUMENTS

| | | | | |
|---|---|---|---|---|
| 6,016,460 | A * | 1/2000 | Olin et al. ...................... 701/102 |
| 6,082,334 | A * | 7/2000 | Shomura et al. .............. 123/478 |
| 2004/0144166 | A1* | 7/2004 | Cullen et al. .................. 73/118.2 |
| 2005/0022795 | A1* | 2/2005 | Beyer et al. ................... 123/516 |
| 2007/0156322 | A1* | 7/2007 | Soga et al. ..................... 701/104 |
| 2010/0031904 | A1* | 2/2010 | Matsuura et al. ........... 123/41.86 |

FOREIGN PATENT DOCUMENTS

| | | |
|---|---|---|
| DE | 100 26 492 A1 | 11/2001 |
| DE | 100 40 764 A1 | 2/2002 |
| DE | 101 63 780 A1 | 7/2003 |
| DE | 102 22 808 A1 | 11/2003 |

(Continued)

*Primary Examiner* — Hung Q Nguyen
*Assistant Examiner* — Ruben Picon-Feliciano
(74) *Attorney, Agent, or Firm* — Henry M. Feiereisen LLC

(57) ABSTRACT

A method for operating an internal combustion engine having at least one venting duct running from a crank chamber of a crankcase to an intake manifold, includes the steps of measuring a fresh air mass flow supplied to the internal combustion engine with an air mass sensor, determining a cylinder charge of at least one cylinder of the internal combustion engine depending on the measured fresh air mass flow, determining during operation a pressure of the crank chamber, and correcting the determined cylinder charge depending on a measured change of the pressure in the crank chamber. A control element for a controller of an internal combustion engine, in particular an automobile, carrying out the method, and an internal combustion engine, in particular in an automobile, with such control element are also described.

8 Claims, 3 Drawing Sheets

(56) References Cited

FOREIGN PATENT DOCUMENTS

| DE | 697 32 890 T2 | 8/2005 |
| DE | 102004008891 | 9/2005 |
| DE | 102004030908 | 1/2006 |
| DE | 102007042408 | 3/2009 |
| DE | 102007046489 | 5/2009 |
| DE | 102007050087 | 6/2009 |
| JP | 2009203868 A | 9/2009 |

* cited by examiner

METHOD FOR OPERATING AN INTERNAL COMBUSTION ENGINE, CONTROL ELEMENT, INTERNAL COMBUSTION ENGINE

CROSS-REFERENCES TO RELATED APPLICATIONS

This application claims the priority of German Patent Application, Serial No. 10 2010 052 644.4, filed Nov. 29, 2010, pursuant to 35 U.S.C. 119(a)-(d), the content of which is incorporated herein by reference in its entirety as if fully set forth herein.

BACKGROUND OF THE INVENTION

The present invention relates to a method for operating an internal combustion engine which includes at least one venting duct running from a crank chamber of a crankcase to an intake manifold as well as an air mass sensor for measuring a fresh air mass flow supplied to the internal combustion engine, wherein depending on the measured fresh air mass flow a cylinder charge of at least one cylinder of the internal combustion engine is determined based on the measured fresh air mass flow.

The present invention also relates to a control element for a controller of an internal combustion engine, in particular of an automobile.

The present invention furthermore relates to an internal combustion engine, in particular for an automobile, with a crankcase forming a crank chamber as well as at least one cylinder with which an intake manifold is associated, wherein a venting duct extends from the crank chamber to the intake manifold, with an air mass sensor for measuring a fresh air mass flow supplied to the internal combustion engine, and with first means for determining a cylinder charge of the cylinder as a function of the measured fresh air mass flow.

The following discussion of related art is provided to assist the reader in understanding the advantages of the invention, and is not to be construed as an admission that this related art is prior art to this invention.

The method, the control elements and the internal combustion engine of the aforedescribed type are known. When operating internal combustion engines, it is customary for attaining optimal combustion, for example in relation to torque and/or exhaust gas values, to match the fuel quantity and the fresh air mass supplied to the combustion chambers and to the cylinders, respectively, of the internal combustion engine. It is known to measure the fresh air mass flow supplied to the internal combustion engine and to determine therefrom a cylinder charge, i.e., the quantity of fresh air mass reaching the cylinders. An expected cylinder charge it is thus determined, to which the quantity of the injected fuel can be adapted.

It is also known to vent the crank chamber of the crankcase on a regular basis or continuously, for example to prevent the generation of combustible gases/vapors in the crank chamber. For this purpose, the crank chamber is connected to an intake manifold of the internal combustion engine by way of a venting duct. The crank chamber is vented or evacuated as a result of the suction effect of the fresh air mass flow flowing through the intake manifold on the venting duct. An actuatable valve may also be provided for venting commensurate with the demand.

Conventional methods and internal combustion engines have the disadvantage that the air mass sensor measures only the total fresh air mass supplied to the internal combustion engine, but does not measure changes in the mass flow occurring internally in the system. It was therefore thus far not possible at all or only by using additional sensors to take into consideration the additional gas mass, which reaches the intake manifold and also affects the cylinder charge, caused by the venting of the crank chamber.

It would therefore be desirable and advantageous to obviate prior art shortcomings and to provide an improved method, a control element and an internal combustion engine which takes into account system-internal mass flow changes affecting the cylinder charge in a simple and cost-effective manner.

SUMMARY OF THE INVENTION

According to one aspect of the present invention, a method for operating an internal combustion engine, which includes at least one venting duct running from a crank chamber of a crankcase to an intake manifold, includes the steps of measuring a fresh air mass flow supplied to the internal combustion engine with an air mass sensor, determining a cylinder charge of at least one cylinder of the internal combustion engine depending on the measured fresh air mass flow, determining during operation a pressure of the crank chamber, and correcting the determined cylinder charge depending on a measured change of the pressure in the crank chamber.

With the method of the invention, the pressure in the crank chamber can be determined during the operation and the determined cylinder charge can be corrected depending on the measured change in the pressure. Instead of providing an additional sensor, existing systems are used for modeling the actual mass flow that determines the cylinder charge. A pressure change in the pressure chamber indicates that gas or also vapor was withdrawn from the pressure chamber. Long-term pressure changes caused by, for example, outgassing of the oil in the crank chamber can thus be neglected. The pressure is therefore an indicator for the gas mass that was withdrawn from the crankcase and added to the fresh air mass in the intake manifold. By measuring the pressure and in particular the pressure change in the pressure chamber, conclusions about the corresponding gas mass flow can be drawn and the previously determined cylinder charge can be corrected or adapted accordingly. Reliable information about the actual cylinder charge can then be readily obtained, thus allowing a reliable control of the internal combustion engine. In the context of the present invention, the term intake manifold refers essentially to the entire intake duct of the internal combustion engine. The intake manifold can therefore be a section of the intake duct arranged upstream or downstream of an optional turbocharger, in particular an exhaust gas turbocharger. In addition, the term gas mass or gas mass flow also refers to the volume which is not exclusively present as a gas, but which may also contain vapor components.

According to an advantageous feature of the present invention, the determined cylinder charge may be corrected by measuring a gas mass flow from the crank chamber to the intake manifold through the venting duct depending on the measured pressure change. As already mentioned above, the cylinder charge may then be inferred from the measured gas mass flow. Alternatively, the measured cylinder charge may be adapted or corrected as a function of the pressure or the pressure change, for example, by multiplication with a factor corresponding to the measured pressure change.

According to another advantageous feature of the present invention, the gas mass flow may be determined with the ideal gas equation. The ideal gas equation which describes the behavior and the properties of an ideal gas is generally known as ideal gas law and will therefore not be explained in detail.

The ideal gas equation represents a good approximation to the actual gas situation in the internal combustion engine and in the venting duct, through which the gas mass flow is transported to the intake manifold or the intake duct of the internal combustion engine. According to another advantageous feature of the present invention, the oil temperature of the oil in the crankcase and/or the crank chamber as well as the specific applicable crank chamber volume is taken into account when determining the gas mass flow with the ideal gas equation.

According to another advantageous feature of the present invention, the gas quality of the gas mass flow may be determined and the determined gas mass flow may be influenced, in particular weighted, depending on the gas quality. For this purpose, a simplified loading model may be used, which measures or determines the proportion of oxygen to fuel. Not only can the mass of the cylinder charge then be determined, but the quality of the cylinder charge can also be determined, thus providing additional advantages for more accurately adapting the fuel supply. According to one advantageous feature of the present invention, the gas mass flow may be weighted with an applicable/applied quality factor depending on the gas quality.

According to another advantageous feature of the present invention, the pressure in the crank chamber may be determined depending on an operating state, in particular an operating point, of the internal combustion engine. The pressure in the crank chamber is then not determined by a sensor which directly measures the pressure, which is contemplated in an alternative embodiment, but is instead defined depending on the operating state of the internal combustion engine. The term operating state of the internal combustion engine refers hereby more particularly to different operating points, in particular relating to load and rotation speed. A change in the operating point also changes the suction which acts on the venting duct on the crank chamber and adjusts the gas mass flow. The operating state can be determined, for example, by actuating an accelerator pedal of the automobile and/or based on data from a controller of the internal combustion engine. According to another advantageous feature of the present invention, the pressure is determined or modeled by using a PT1 filter or PT1 element, in particular a PT1 low pass filter.

According to another advantageous feature of the present invention, the pressure may be determined with at least one characteristic curve and/or at least one characteristic curve field depending on the operating state of the internal combustion engine. The pressure may, for example, be measured for different operating states of the internal combustion engine and stored or applied in a non-volatile memory in a characteristic curve and/or a characteristic curve field. During operation, the generated characteristic curve field or characteristic curve can then be accessed and the pressure in the crank chamber can be quickly and easily determined.

According to another advantageous feature of the present invention, the ambient temperature and/or the ambient pressure may be taken into account when determining the pressure in the crank chamber. In particular, a characteristic curve or characteristic curve field may be selected from different aforedescribed characteristic curves or characteristic curve fields, depending on the ambient temperature and/or the ambient pressure. It would also be feasible to provide a characteristic curve field which already includes or takes into account the ambient temperature and/or the ambient pressure in addition to the operating point of the internal combustion engine. The ambient pressure may be measured or determined, for example, from altitude data and/or by using a suitable pressure sensor.

According to another advantageous feature of the present invention, in order to achieve optimal combustion, a fuel quantity supplied to the respective cylinder may be adapted depending on the corrected cylinder charge.

Overall, an optimal fuel quantity as a function of the fresh air mass flow measured by the air mass sensor and the determined internal gas mass flow from the crank chamber into the intake manifold can therefore be determined with the method of the invention.

According to another aspect of the invention, a controller of an internal combustion engine includes the control element according to the invention, wherein a program stored in the control element can be executed on a computer, for example a microprocessor, wherein the control element is able to carry out the method according to the invention.

According to yet another aspect of the invention, an internal combustion engine includes a controller with the control element according to the invention, and second means for determining the pressure in the crank chamber of the crankcase and for correcting the determined cylinder charge as a function of the measured change of the pressure in the crank chamber, in particular by using the method according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
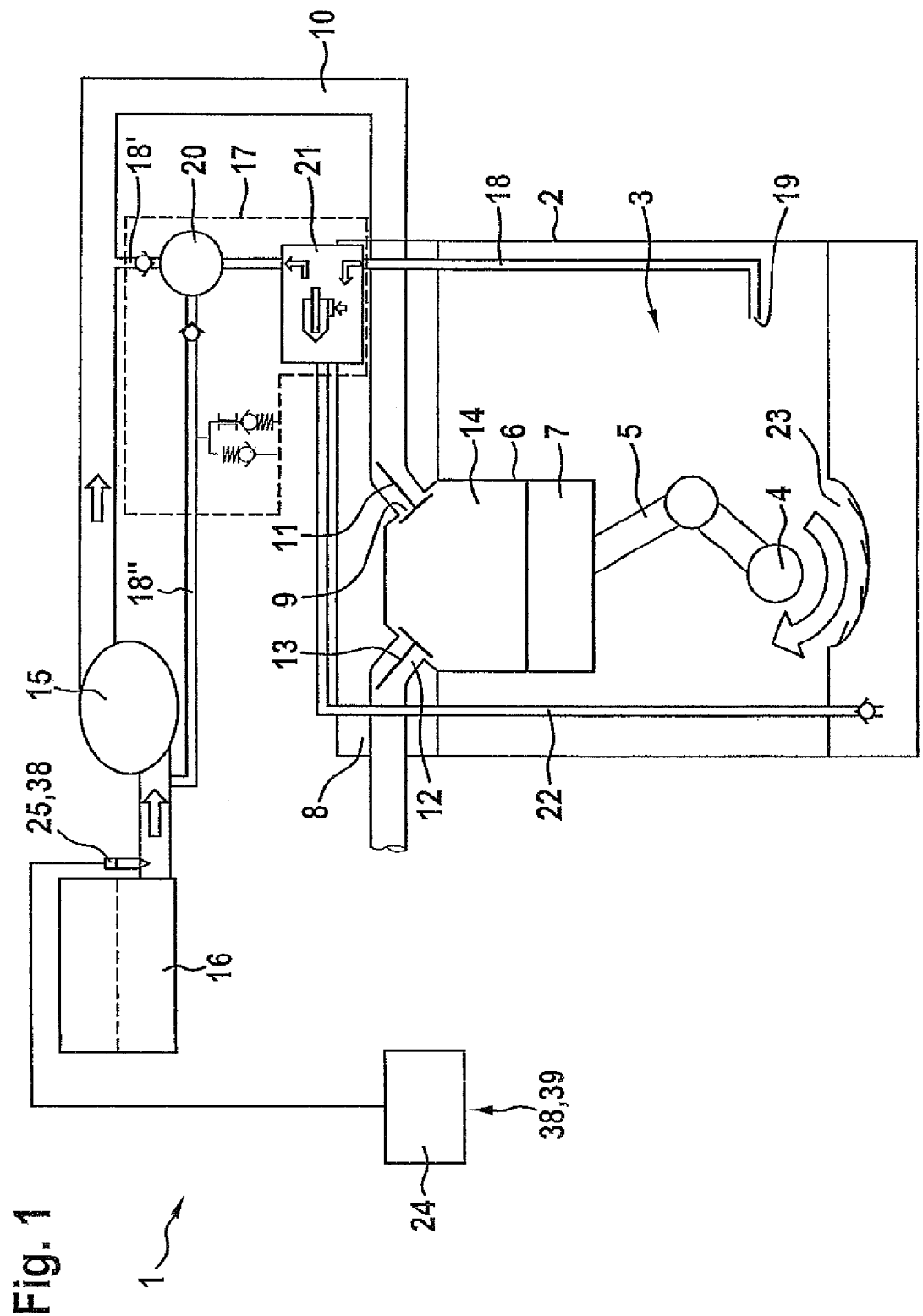
FIG. 1 shows a simplified diagram of an internal combustion engine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a simplified diagram an internal combustion engine 1 of an unillustrated automobile. The internal combustion engine 1 includes a crankcase 2 which forms a crank chamber 3. A crankshaft 4 of the internal combustion engine 1 is supported for rotation in the crank chamber 3. Also arranged in the crank chamber 3 is the connecting rod 5 driven by the crankshaft which is connected in a conventional manner with a piston 7 which is axially movable in a cylinder 6, as well as an oil windage tray 23. The cylinder 6 is closed at the top by a cylinder head 8 of the internal combustion engine 1; an inlet opening 9 is formed in the cylinder head, with an intake manifold for supplying fresh air extending into the cylinder 6. The inlet opening 9 can be closed and opened with an actuatable valve 11. The cylinder head 8 also includes an outlet opening 12 which transitions into an outlet duct and which can be opened and closed with an actuatable valve 13. The cylinder 6, the cylinder head 8 and the piston 7 thus form a combustion chamber 14 of the internal combustion engine 1. Advantageously, the internal combustion engine 1 includes several such combustion chambers and thus corresponds to conventional internal combustion engines which will not be discussed here in detail. The intake manifold 10 which opens into one or several combustion chambers originates from the outlet side of a compressor of the exhaust gas turbocharger 15. The inlet side of the compressor of the exhaust gas turbocharger 15 is in turn connected to an air filter 16.

The internal combustion engine 1 also includes a venting device 17. The venting device 17 includes a venting duct 18 having a withdrawal opening 19 located in the crank chamber 3, and a pressure control valve 20 for connecting the crank chamber 3 with the intake system of the internal combustion engine 1 via the ventilation duct 18. For this purpose, the venting duct 18 divides into two parts downstream of the pressure control valve 20, wherein a first part 18' opens into the intake manifold 10 downstream of the exhaust gas turbocharger 15 and a second part 18" opens into the intake system between the air filter 16 and the exhaust gas turbocharger 15. A corresponding check valve is arranged in each of the part 18' and the part 18". An oil separator 21, which takes oil out of the medium withdrawn from the combustion chamber 3 and returns the oil through a oil return line 22 to the oil pan of the crankcase 2, is arranged upstream of the pressure control valve 20. Oil separators are generally known and will therefore not be described here in detail.

The internal combustion engine 1 also includes a control device 24 which operates the internal combustion engine 1 as an engine controller. To adjust the fuel-air mixture for optimal combustion in the combustion chamber 14 commensurate with the demand, the control unit 24 is connected with an air mass sensor 25 which is arranged in the intake system between the air filter 16 and the exhaust gas turbocharger 15 and measures the fresh air mass flow flowing through the air filter 16 into the intake system. The control unit 24 measures the cylinder charge, i.e., the fresh air mass supplied to the combustion chamber 14, based on the measured fresh air mass flow. The control unit 24 determines the quantity of fuel to be injected based on the cylinder charge. Although means for injecting the fuel are provided, these are sufficiently known to a skilled artisan and therefore not shown in the drawing, and need not be described in detail at this point.

During operation, fresh air flows—as indicated by arrows—from the air filter into the exhaust system through the exhaust gas turbocharger 15 and the intake manifold 10 into the combustion chamber 14. At the location where the venting duct 18 opens into the intake system, the fresh air flowing past the mouth opening creates suction which causes gas to be suctioned from the crank chamber 3 and added to the fresh air when a pressure control valve 20 is opened or adjusted accordingly. Depending on the setting of the pressure control valve 20, the gas removed from the pressure chamber 3 is mixed to the fresh air either upstream of the exhaust gas turbocharger 15 or downstream of the exhaust gas turbocharger 15. The gas mass flow created by the suction, which is added by the venting duct 18 to the fresh air, affects the cylinder charge, i.e. the gas volume and the gas composition in the combustion chamber 14, which the air mass sensor 25 would not be able to detect.

Figure 2:
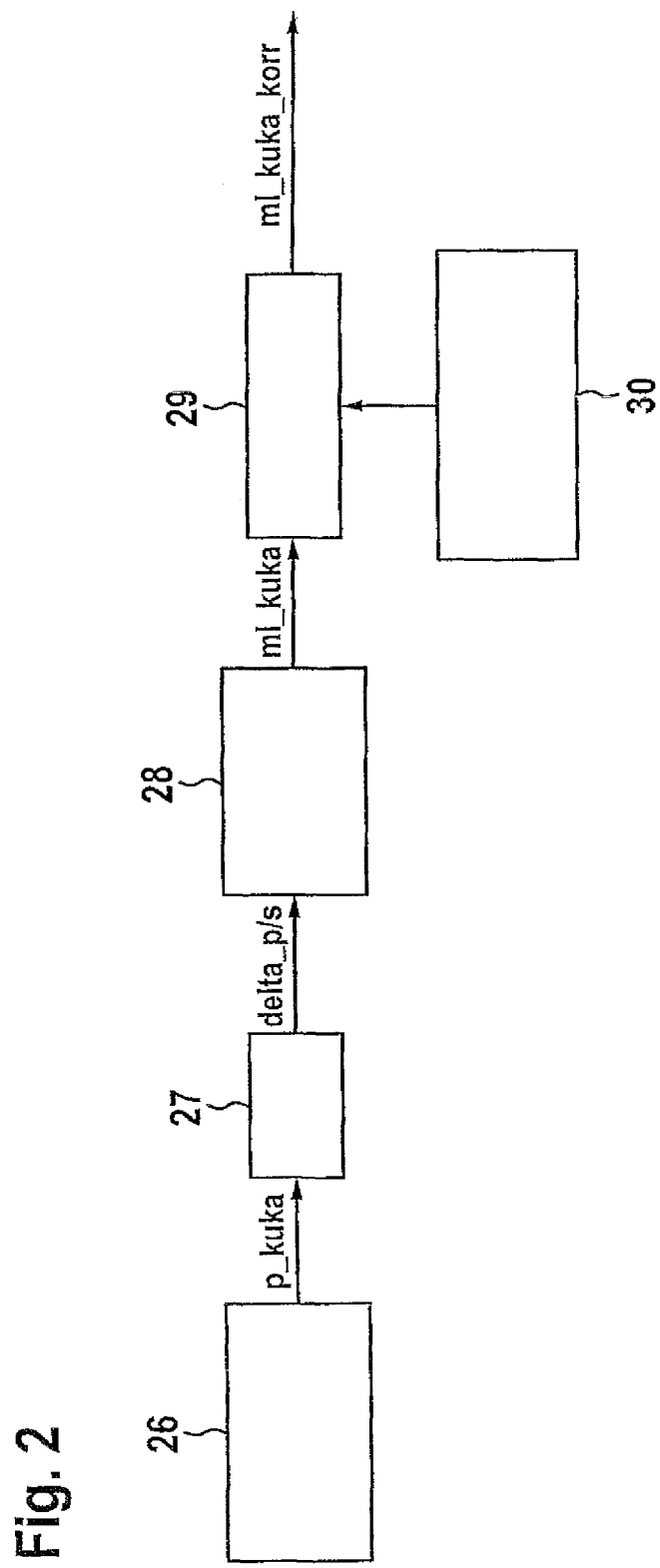
FIG. 2 shows a flow diagram of the method according to the invention for operating the internal combustion engine.

The control unit 24 therefore advantageously includes a control element suitable for carrying out the method, as schematically illustrated in FIG. 2 in a flow diagram. According to the method, at a first step 26, the pressure p_kuka in the crank chamber 3 is determined. If the pressure control valve 20 is adjusted so that either the channel 18' or the channel 18" is open, then the pressure in the crank chamber 3 essentially changes only depending on the operating state of the internal combustion engine 1. When the operating state, in particular the operating point relating to rotation speed and/or torque, changes, the fresh air mass flow supplied to the internal combustion engine 1 which flows through the intake manifold also changes, and hence also the gas mass flow withdrawn from the pressure chamber 3 through the venting duct 18. Depending on the operating state or operating point, a crank chamber pressure p_kuka is reached. Preferably, the crank chamber pressure is determined by the control device 24 depending on the set operating state of the internal combustion engine. In particular, at least one characteristic curve field and/or characteristic curve are provided for this purpose, from which the prevailing crank chamber pressure can be deduced depending on the operating state. Data for the characteristic curve or the characteristic curve field are advantageously experimentally determined before startup of the internal combustion engine 1.

At a subsequent step 27, the current determined crank chamber pressure is compared with a crank chamber pressure at an earlier time for determining a change in pressure in the crank chamber 3, or the crank chamber pressure is differentiated with respect to time (d/dt). If a change in the pressure or a pressure change delta_p/s is measured, then the gas mass flow ml_kuka caused by the pressure change and flowing through the venting duct 18 is computed or determined with the ideal gas equation at a subsequent step 28. With the determined gas mass flow and the measured fresh air mass flow, the cylinder charge of the combustion chamber(s) 14 of the internal combustion engine 1 can now be determined by correcting the determined cylinder charge depending on the gas mass flow. Moreover, an adapted fuel quantity can then be determined depending on the corrected cylinder charge which should be added to the cylinder charge to achieve optimal combustion.

Preferably, the determined gas mass flow ml_kuka is corrected at an additional step 29. For this purpose, the gas quality of the gas mass flow removed from the crank chamber 3, i.e. the oxygen to fuel ratio, is determined with a loading model. The gas mass flow is affected, and in particular weighted, at step 29 by the measured or determined gas quality, wherein the weighted gas mass flow can be used to correct the cylinder charge.

Figure 3:
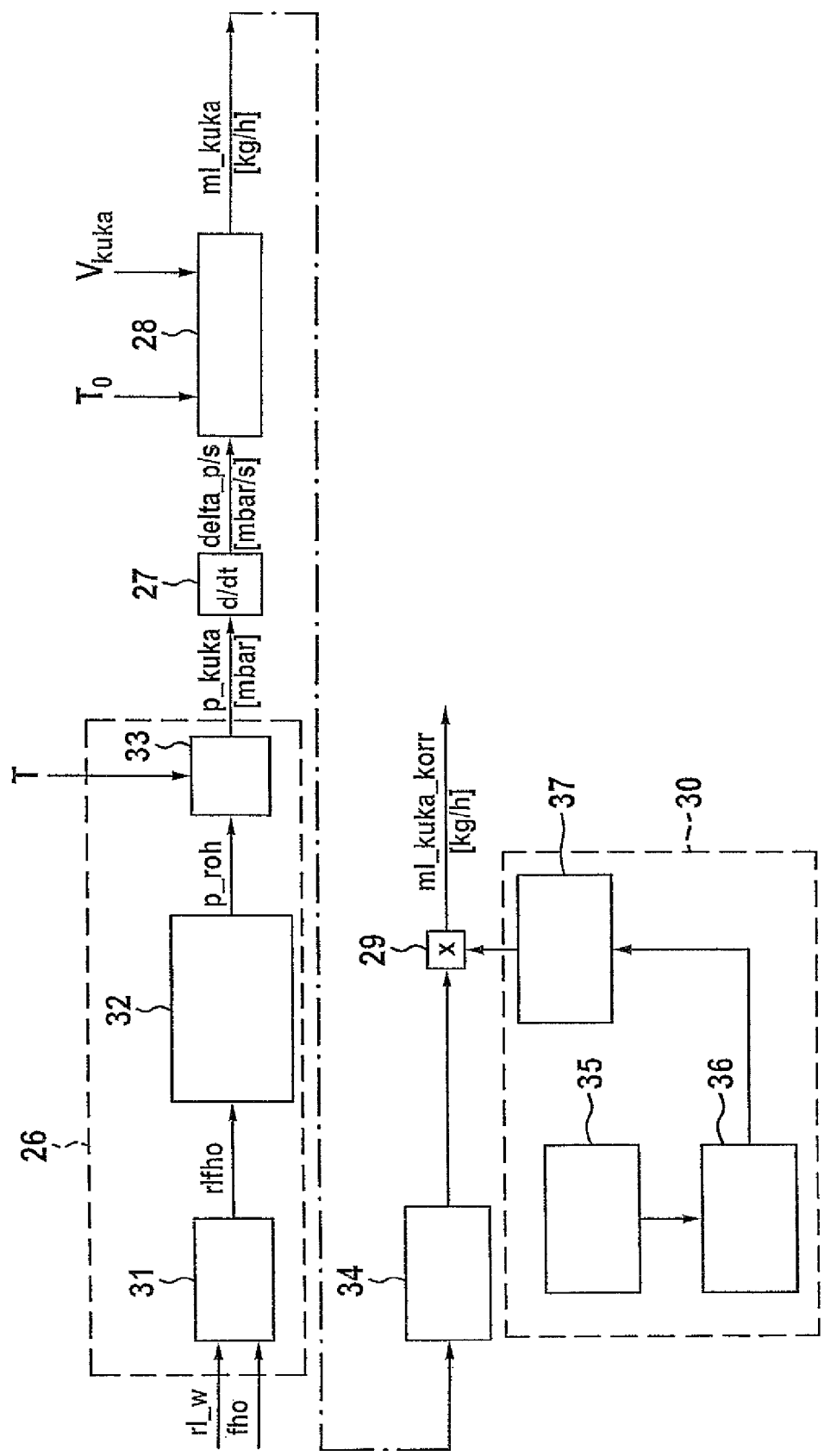
FIG. 3 shows a flow diagram of a modified embodiment of the method according to the invention.

FIG. 3 shows an improved modification of the afore-described method, wherein already described elements have identical reference characters, so that reference is made to the above description. Only the differences or additions will now be discussed in more detail.

According to the modified exemplary embodiment, step 26 is distinguished by three partial steps 31, 32, 33. At the first partial step 31, the so-called relative load rl, which is an indicator for the cylinder charge and the supplied fresh air mass flow, respectively, as well as an altitude factor fho are supplied to a first characteristic curve field, from which an altitude-corrected load value rlfho is obtained. Depending on the altitude-corrected load value rlfho and the rotation speed nmot of the internal combustion engine, a stationary relative crank chamber pressure p_roh is determined by using an additional characteristic curve field at the partial step 32. At the partial step 33, the stationary relative crank chamber pressure p_roh is transmitted through a PT1 low-pass filter having a time constant T which can be applied to obtain the pressure in the crank chamber and/or the crank chamber pressure p_kuka, respectively.

At the following step 27, the crank chamber pressure p_kuka is differentiated with respect to time for obtaining the pressure change delta_p/s which is supplied to the ideal gas equation at step 28. The crank chamber volume $V_{kuka}$, as well as the oil temperature $T_o$, i.e. the temperature of the oil residing in the crank chamber or the oil pan, respectively, represent additional quantities supplied to the ideal gas equation. This yields, as described above, the total gas mass flow ml_kuka, for example in kilograms per hour.

At a following step 34, the gas mass flow is subjected to a first weighting. For this purpose, a characteristic curve is used which takes the gas mass flow into account for the further determination only when pressure changes or gas mass flows exceeding a predetermined minimum value were measured or determined.

At the subsequent step, the considered gas mass flow ml_kuka is weighted with a loading factor for obtaining the corrected gas mass flow ml_kuka_korr. At step 30, a time constant in the first partial section 35 is determined in a characteristic curve field depending on the engine rotation speed and the relative load, and the loading factor representing the oxygen to fuel ratio in the gas mass flow is used at a second partial step 36 to compute an integral using an integrator. At an additional partial step 37, the loading factor is weighted using an additional characteristic curve, and at step 29 multiplied with the weighted gas mass flow ml_kuka for obtaining the corrected gas mass flow ml_kuka_korr.

The air mass sensor 25 and the control device 24 thus represent first means 38 for determining the cylinder charge depending on the measured fresh air mass flow. At least the control device 24, the aforedescribed control element integrated therein, and the respective stored characteristic curve fields and/or characteristic curves hereby form second means 39 for determining the pressure p_kuka and for correcting the determined cylinder charge depending of a gas mass flow from the crank chamber 3 into the intake manifold 10.

With the invention, the internal gas flows of the internal combustion engine, which occur when the crank chamber 3 is vented, can thus be taken into account when determining the cylinder charge. Both the quantity and the quality of the gas mass flow, which reach the intake system and/or the intake manifold 10 from the crank chamber during the venting, are then taken into account.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating an internal combustion engine, which comprises at least one venting duct running from a crank chamber of a crankcase to an intake manifold supplying a fresh air mass flow into at least one cylinder of the internal combustion engine, comprising the steps of:
    determining a characteristic curve relating a crank chamber pressure to an operating state of the internal combustion engine,
    storing the characteristic curve in an engine controller,
    measuring a fresh air mass flow supplied to the internal combustion engine with an air mass sensor,
    determining the crank chamber pressure of at least one cylinder of the internal combustion engine for a current operating state of the internal combustion engine depending on the measured fresh air mass flow and the stored characteristic curve,
    comparing the so determined crank chamber pressure with a previously determined crank chamber pressure to determine a temporal change of the crank chamber pressure;
    determining from the temporal change of the crank chamber pressure and the measured fresh air mass flow a gas mass flow transported from the crank chamber to the intake manifold through the at least one venting duct;
    determining a cylinder charge from the measured fresh air mass flow and from the determined gas mass flow, and
    correcting the determined cylinder charge, which is determined from the measured fresh air mass flow and from the determined gas mass flow transported from the crank chamber to the intake manifold through the at least one venting duct, by adjusting at least one of the fresh air mass flow and a fuel quantity supplied to the at least one cylinder so as to compensate for the temporal change in the crank chamber pressure.

2. The method of claim 1, wherein the gas mass flow is determined with an ideal gas equation.

3. The method of claim 1, further comprising the step of:
    determining a gas quality of the gas mass flow, and
    affecting the determined gas mass flow based on the gas quality.

4. The method of claim 3, wherein affecting the determined gas mass flow comprises weighting the determined gas mass flow.

5. The method of claim 1, wherein the operating state includes an operating point of the internal combustion engine.

6. The method of claim 1, wherein the pressure in the crank chamber is determined by using a low-pass (PT1) filter.

7. The method of claim 1, wherein the pressure in the crank chamber is determined by taking into account at least one of ambient temperature and ambient pressure.

8. The method of claim 1, wherein the internal combustion engine is the internal combustion engine of an automobile.

* * * * *